United States Patent
Blattner

[15] 3,678,744
[45] July 25, 1972

[54] TORQUE MEASURING HAND SCREWDRIVER

[72] Inventor: Raymond J. Blattner, Chicago, Ill.
[73] Assignee: Dresser Industries, Inc., Dallas, Tex.
[22] Filed: Nov. 14, 1969
[21] Appl. No.: 876,927

[52] U.S. Cl. ................................................... 73/139
[51] Int. Cl. ............................................. G01l 5/24
[58] Field of Search .................. 73/1 C, 136 A, 139

[56] References Cited

UNITED STATES PATENTS

| | | | |
|---|---|---|---|
| 774,931 | 11/1904 | Bucknam | 73/139 X |
| 839,803 | 1/1907 | Amsler | 73/136 A |
| 2,464,372 | 3/1949 | Booth | 73/139 |
| 2,607,219 | 8/1952 | Millard et al. | 73/139 |
| 3,039,301 | 6/1962 | Leto et al. | 73/136 A |
| 3,069,903 | 12/1962 | Larson | 73/139 |
| 3,304,771 | 2/1967 | Ochs | 73/139 |

Primary Examiner—Charles A. Ruehl
Attorney—Robert W. Mayer, Thomas P. Hubbard, Jr., Daniel Rubin, Raymond T. Majesko, Roy L. Van Winkle, William E. Johnson, Jr. and Eddie E. Scott

[57] ABSTRACT

A torque measuring hand screwdriver in which applied torque is transmitted to the drive bit by means of a torque bar extending axially continuous between the gripping handle and bit support. The bar end connections permit an axial floating to accommodate linear contraction concomitantly with twist. A scale gauge calibrated in torque units registers measured twist as applied torque.

7 Claims, 7 Drawing Figures

Patented July 25, 1972

INVENTOR

RAYMOND J. BLATTNER

Daniel Rubin

ATTORNEY

Patented July 25, 1972
3,678,744
2 Sheets-Sheet 2
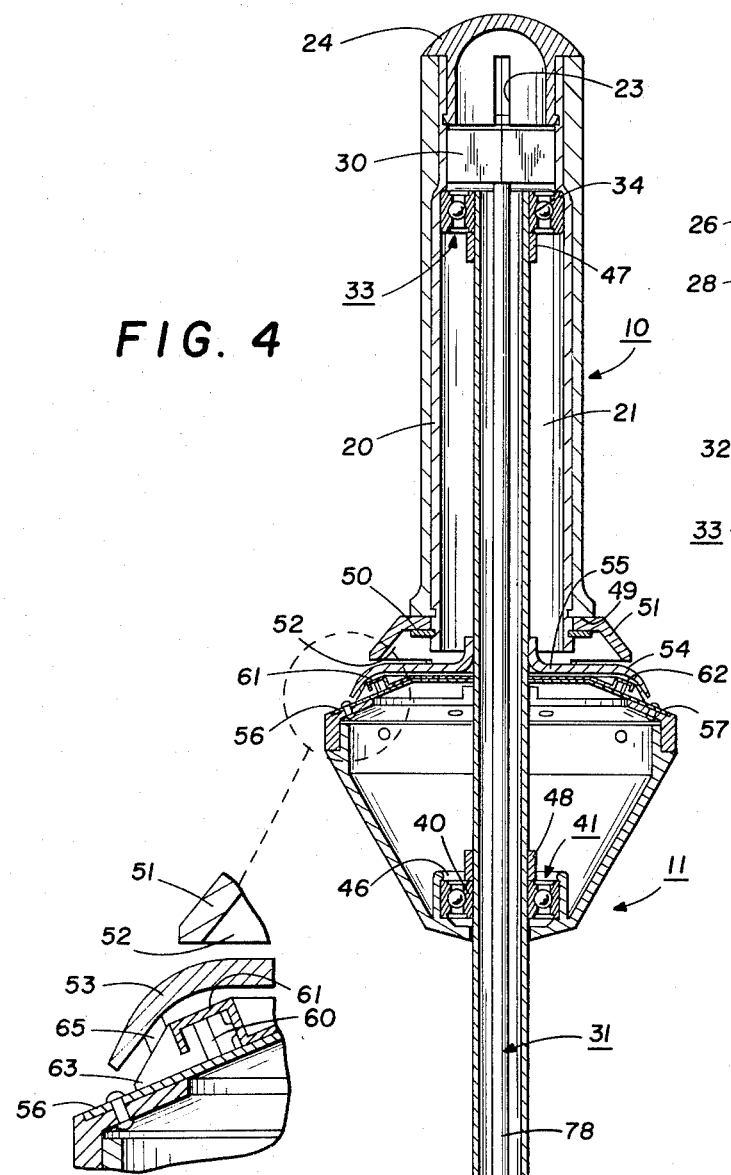
FIG. 4
FIG. 5
FIG. 6
FIG. 7
INVENTOR
RAYMOND J. BLATTNER
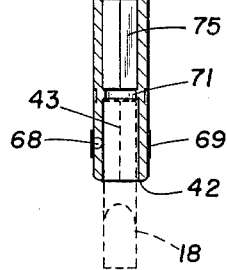
ATTORNEY

TORQUE MEASURING HAND SCREWDRIVER

BACKGROUND OF THE INVENTION

1. The field of art to which the invention pertains includes the art of hand tools and particularly to the class of tools employed for measuring an applied torque as in screwdrivers, wrenches, or the like.

2. Torque tools for applying and/or measuring applied torque have become widely standardized in effecting proper tension on bolts, screws, and the like to insure optimum tightness in the assembly of which these fasteners are a part. Use of torque tools in production and quality control, not to mention numerous other applications, has become almost indispensable in maintaining quality control by elimination of guesswork formerly associated with conventional wrench or screwdriver tightening of assembled products.

Hand operated torque tools are generally divided between two basic types. For pre-setting, assembly or dis-assembly, it is common to employ the tool type which is capable of being pre-set to the desired torque cut-off, as for example exemplified by the disclosure in patent U.S. Pat. No. 2,984,133. When the cut-off torque is attained the tool somehow signals the operator as by a click, clicking or swiveling calling attention to the need not to continue. Applied torque levels below or above the set point is not indicated to the operator, and the purposes for which these tools are employed usually do not require that the operator be aware of intermediate values other than realizing attainment of the set point when reached.

The other basic torque type tool provides a continuous visual indication of attained torque values throughout the operative range of the instrument. This enables an operator to determine applied torque based on a gauge reading thereof and is frequently employed both for application and checking of previously torqued fasteners. An indicator associated with the bending moment incrementally registers changing torque values throughout the range in which torque is applied or relieved. Typical instruments of this latter type are disclosed in U.S. Pat. Nos. 2,464,372 and 3,304,771.

With respect to the measuring or indicating type of torque screwdriver to which the invention hereof is specifically directed, it has been found that prior art tools are generally characterized by insufficient durability to afford desired life expectancy as a production tool and a degree of inherent inaccuracy in registering torque values actually applied. Not only has inaccuracy been known to exist, but the degree of inaccuracy is known to become proportionately greater as the magnitude of applied torque is increased. The former feature is apparently attributable to a prior inability to recognize an appropriate combination of components which can readily transmit the required torque dependably for the desired life expectancy. As for the feature of inaccuracy, the trade despite recognizing its existence has accepted this feature on an inevitable premise based on an apparent inability to recognize a solution by which this deficiency could be easily overcome.

SUMMARY

This invention relates to torque measuring hand screwdrivers of novel construction. More specifically, the screwdriver construction in accordance herewith reliably provides substantially increased life expectancy as compared to similar devices of the prior art. At the same time, it has been discovered that inaccurate torque measurements associated with prior tools is a consequence of axial tension incurred by the axially secured torsion element during application of torque. That is, since torsional bending or twisting of the torsional element normally tends to shorten or reduce its original length, preventing this linear contraction as in the prior art imposed a tensional stress adversely affecting accuracy of the registered torque value. This adverse effect of course increases as a function of load such that at maximum capacity of the tool very substantial read-out error occurs. By means of a novel construction in accordance with the invention hereof, the problem of prior inaccuracy is overcome with a torsional element permitted to axially float within its support.

It is therefore, an object of the invention to provide a torque measuring hand screwdriver of novel construction.

It is a further object of the invention to provide a novel torque measuring hand screwdriver of increased durability and accuracy as compared to similar tools of the prior art.

It is a further object of the invention to provide a novel torque measuring hand screwdriver having an axiAlly floating torsional element reliably affording greater read-out accuracy throughout the tool range as compared to similar tools of the prior art.

It is a further object of the invention to provide a novel torque measuring hand screwdriver as in the aforesaid objects yet simple in construction and relatively inexpensive to fabricate.

BRIEF DESCRIPTION OF THE DRAWINGS

FIG. 4 is a sectional view taken substantially along the lines 4—4 of FIG. 1;

FIG. 5 is a fragmentary, enlarged sectional view within the encircled portion of FIG. 4;

FIG. 6 is a fragmentary, enlarged sectional view of the handle end construction; and FIG. 7 is a fragmentary, enlarged sectional view taken at the bit end of the tool.

DESCRIPTION OF THE PREFERRED EMBODIMENT

Figure 1:
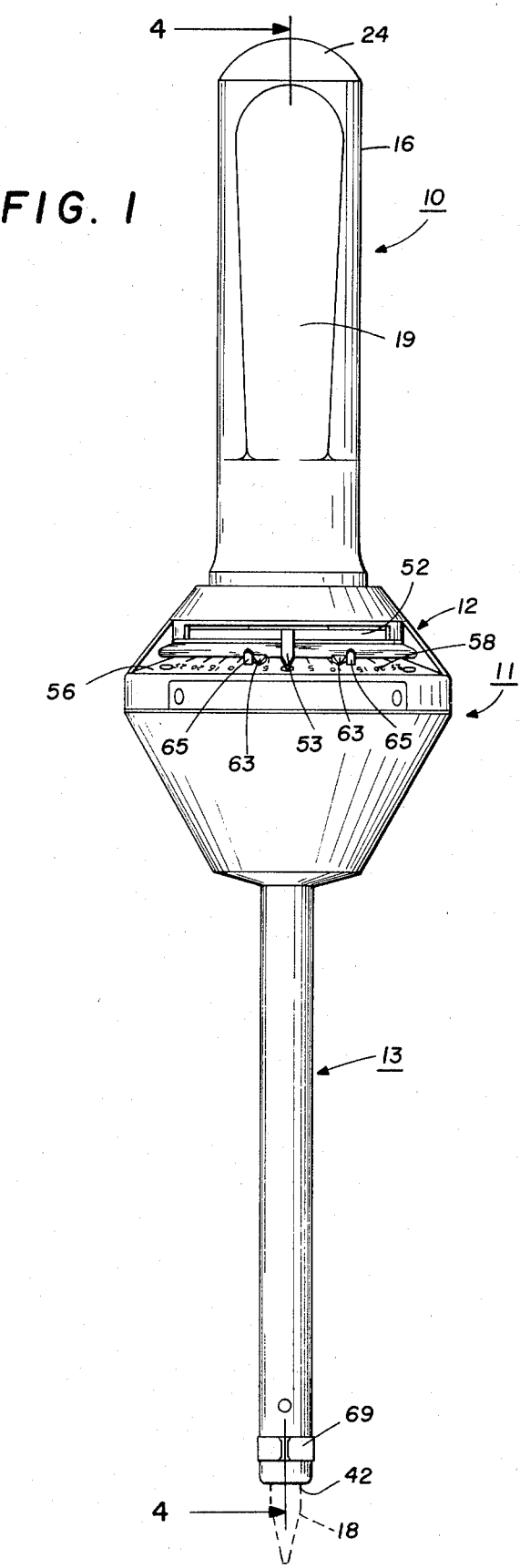
FIG. 1 is an exterior sectional view of the screwdriver hereof.
Figure 2:
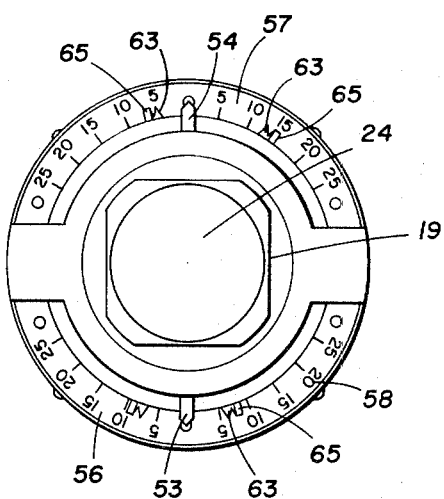
FIG. 2 is a view from the handle end of FIG. 1.

Referring now to the drawings, the tool hereof as seen in FIG. 1 is generally comprised of a gripping handle 10 connected to an enlarged bulbous shaped bearing housing 11 in turn connected to an elongated shank in the form of a torque tube 13. On the top side of housing 11 is a gauge 12 which registers torque measurement while load is being applied. The outmost end of the torque tube is adapted to receive a bit, such as a screwdriver bit 18 (shown dashed) it being understood that "screwdriver" as herein used is not intended to limit use hereof to conventional flat blade screwdriver ends but to also embrace bits of various well-known types such as Phillips head, Allen head, socket heads and the like.

Handle 11 as can be seen with specific reference to FIGS. 4 and 6 comprises an outer jacket 16 suitably formed of metal, wood or the like and preferably of plastic having flats 19 for convenience of gripping. Molded or pressed within the jacket is a sleeve liner 20 defining an axially extending open passage 21. Closing the topmost end of the handle is a removable dome-shaped cap 24 split along grooves 23 having a radial extending flat face 25 seating against the handle end. Extending downward from the face is an annular bushing 26 terminating in a radial flange 27 received within radial recess 28 of the liner. The cap in its assembled relation enjoys a loose fit within the liner permitting relative rotation therebetween affording operator comfort when held in the operator's palm. By this means, the cap will remain relatively fixed as the tool is rotated in application of torque.

Figure 3:
FIG. 3 is a view from the bit supporting end of FIG. 1.

Sleeve 20, at its upper end, has a non-circular internal shape preferably polygonal in which to support a complementary shaped upper end 30 of torsional element 31 interlocked against rotation as will be described. Immediately below the space provided for end 30, sleeve 20 slightly enlarges to secure the outer race of ball bearing 33. The inner bearing race 34 provides rotational support to the upper end of torque tube 13 which extends downward therefrom where it receives similar intermediate support on the inner race 40 of ball bearing 41. Terminal end 42 of the tube defines an internal socket 43 (FIG. 3) in which bit 18 is received, as will further be described.

Bearing housing 11 is fixedly secured to the handle 10 by means of a bevelled "Truarc" ring fastener 50 secured to sleeve 20. The fastener underlies the radially outward surface of housing skirt portion 51 frictionally urging it upward against the lower end 49 of the handle. Beneath the skirt the housing provides an opening 52 through which extends a pair of oppositely positioned pointers 53 and 54. Each pointer is formed integral with disc 55 centrally flared where it is attached by soldering or the like to the exterior of torque tube 13 for conjoint movement. Below the pointer, housing 11 enlarges to provide an outward slope on which are secured calibrated scales 56 and 57 containing torque units 58. Turning the handle during a torquing application will displace the scales relative to pointers 53 and 54 as a function of torque magnitude being applied. The value registered by the pointers 53 and 54 represent the measured torque in either foot pounds or inch pounds as it suits the application for which the tool is being utilized.

Associated with the pointer in the preferred embodiment hereof, is a memory indicator to record maximum torque for each individual application of use and which may be of a type generally disclosed in aforementioned patent U.S. Pat. No. 3,304,771. As more completely described therein, the memory feature comprises a plurality of arcuate bars 60, a pair of which are maintained in one of arcuate channels sections 61 or 62. Integrally extending radially outward from each bar is a pointer 63 and upstanding from the latter is a shoulder 65. The shoulders extend into the measurement path of pointers 53 and 54 during scale displacement relative thereto and by engagement move associated pointer 63. Since pointer 63 is not characterized by self return it remains at the position of maximum displacement corresponding to the value of maximum applied torque. By this means, the value of maximum applied torque remains readily identifiable in event the operator fails to note the maximum value for whatever reason.

From beneath the scales housing 11 frusto-conically contracts until again embracing torque tube 13 at which it forms a bearing pocket 46 containing bearing 41.

Torque tube 13 includes soldered ferrules 47 and 48 positioning the tube between the side faces of bearings 33 and 41 respectively. Emerging from the bearing housing the tube extends to a terminal end 42 having bit receiving socket 43. Contained in the sidewall thereat is a ball 68 partially protrudable into socket 43 and retained in place by a spring clip 69. The clip maintains ball 68 in tight engagement against the sidewalls of a received bit for securing the latter against inadvertent dropout. Shoulder 70 on the underside of annular rib 71 formed by crimping the tube defines the innermost extent to which a bit can be inserted. Immediately above rib 71 the tube defines an internal space 74 having polygonal walls in which to receive complementary shaped lower end 75 of torsion element 31.

Secured between the ends 30 and 75 of torsion element 31 is a torque shaft or bar 78 of selected material, diameter and length affording the desired torsion properties consistent with the calibrations contained on scales 56 and 57. For providing 25 inch pound capacity, bar 78 in a preferred embodiment comprises 0.115 inch diameter type D chrome Vanadian tool steel pack annealed and heat-treated to provide Rockwell "C" 48–50, all of which are determined by known mathematical formulas.

Critical to accurate tool operation is that the flat surfaces of one or both ends 30 and 75 contiguous to adjacent sidewalls of sleeve 20 and tube 13 respectively enjoy a slight clearance with respect thereto. Normally, clearance is on the order of 0.001 to 0.005 inches between adjacent surfaces and usually about 0.003 inches across flats. By this means, a slip fit is formed at the ends permitting unbound linear contraction of bar 78 as it shortens in response to torque twist. This effect can be seen in FIGS. 6 and 7 in which contracted movement of the ends are represented in dashed outline.

In operation of the tool an appropriate bit for work engagement is inserted in socket end 43 of torque tube 13. The bit is then placed on or in operative engagement with a screw, bolt, or the like fastener to be tightened or loosened and handle 10 is rotated in the appropriate direction in the manner of a conventional screwdriver. Assuming tool use for tightening a fastener only sufficient torque is applied to overcome the frictional encounter during free running thereof. As the fastener approaches its end of travel near-assembly relation, resistance to turning increases requiring application of additional torque to overcome. Continued turning moment applied to the handle for increasing torque angularly displaces the handle relative to bit 18. Scales 56 and 57 securely attached to the handle become correspondingly displaced relative to pointers 53, 54 secured to torque tube 13. The latter displacement likewise causes displacement of pointers 63 which remain positioned at the measurement of maximum torque value after the turning moment is released and the scales revert to the zero position below pointers 53 and 54.

By the above description, there is disclosed a novel torque measuring hand screwdriver that is sturdily built for use as a production tool and by virtue of an axially floating torque bar produces an accurate torque reading throughout the operating range of the tool. In achieving this result the tool satisfies a long-felt need in overcoming the deficiency of inaccuracy in similar tools of the prior art. As can be appreciated, the relatively simple tool is provided with a high degree of scientific accuracy for meeting the requirements of industry.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A torque screwdriver comprising:
   a. a gripping handle to which torsion moment can be applied;
   b. an elongated shank supportably connected to said gripping handle for rotation relative thereto and extending coaxially away from said gripping handle to a terminal end at which to support a work engaging drive bit;
   c. an elongated torque bar extending coaxially with said shank; and
   d. means connecting said torque bar in a rotatably secure relation at one end to said gripping handle and at the other end to said shank at a location displaced from said gripping handle;
   e. said connecting means comprising a connecting member secured to said torque bar at at least one of said located connections extending non-circular in an axial direction into a contiguous, complementary, non-circular interfit with at least one of the handle and shank effecting a rotatable interlock and an axially slideable relation therebetween for providing said torque bar freedom of linear contraction in response to an applied torsion moment transmitted between said gripping handle and a supported drive bit in work engaging relation.

2. A torque screwdriver according to claim 1 including measuring means for registering the magnitude of applied torsion moment as a function of relative angular displacement between said gripping handle and a drive bit in work engaging relation.

3. A torque screwdriver according to claim 2 in which said measuring means includes memory means continuing to register maximum applied torsion moment after an applied torsion moment is removed from said gripping handle.

4. A torque screwdriver according to claim 1 in which said shank comprises a tube extending about said torque bar.

5. A torque screwdriver according to claim 4 including measuring means for registering the magnitude of applied torsion moment as a function of relative angular displacement between said gripping handle and a drive bit in work engaging relation.

6. A torque screwdriver according to claim 5 in which said measuring means comprises a relatively movable scale and pointer, one of which is secured to said gripping handle and the other of which is secured to said shank.

7. A torque screwdriver according to claim 6 in which said measuring means includes memory means continuing to register maximum applied torsion moment after an applied torsion moment is removed from said gripping handle.

* * * * *